United States Patent [19]

Mokveld et al.

[11] Patent Number: 4,812,277

[45] Date of Patent: Mar. 14, 1989

[54] PROCESS FOR THE PREPARATION OF POLYVINYL ALCOHOL ARTICLES OF HIGH STRENGTH AND MODULUS

[75] Inventors: Floribertus C. H. Mokveld, Roermond; Ronald M. A. M. Schellekens, Maastricht, both of Netherlands

[73] Assignee: Stamicarbon B.V., Geleen, Netherlands

[21] Appl. No.: 106,592

[22] Filed: Oct. 13, 1987

Related U.S. Application Data

[63] Continuation of Ser. No. 898,403, Aug. 20, 1986, abandoned.

[30] Foreign Application Priority Data

Aug. 23, 1985 [NL] Netherlands ................ 8502315

[51] Int. Cl.$^4$ ............................................... D01F 6/14
[52] U.S. Cl. ................................... 264/185; 264/203
[58] Field of Search ........................... 264/185, 203

[56] References Cited

U.S. PATENT DOCUMENTS

| | | | |
|---|---|---|---|
| 3,066,999 | 12/1962 | Nakajo et al. | 264/185 |
| 4,440,711 | 4/1984 | Kwon et al. | 264/185 |
| 4,603,083 | 7/1986 | Tanaka et al. | 264/210.8 |

*Primary Examiner*—James Lowe
*Attorney, Agent, or Firm*—Cushman, Darby & Cushman

[57] ABSTRACT

Polyvinyl alcohol articles of high strength and modulus are obtained by thermoreversible gelation of a polyvinyl alcohol solution, extraction of the gelation solvent using a mixture of a low alcohol or ketone and water, followed by high stretching. Preferably, a mixture of 5-80 vol. % of acetone and 95-20 vol. % of water is used as extractant. With this process extraction times of only 3-10 minutes are required.

13 Claims, No Drawings

PROCESS FOR THE PREPARATION OF POLYVINYL ALCOHOL ARTICLES OF HIGH STRENGTH AND MODULUS

This is a continuation of application Ser. No. 898,403, filed Aug. 20, 1986, and now abandoned.

BACKGROUND OF THE INVENTION

The invention relates to a process for the preparation of polyvinyl alcohol articles of high tensile strength and high modulus.

Synthetic fibres on the basis of polyvinyl alcohol are well-known and have found large-scale application in the form of staple fibres (cut fibres) in the production of, inter alia, paper coating, non-wovens and heavy yarns (canvas, etc.) and in the form of continuous fibres for separation purposes in textile production lines and for reinforcement of rubbers, plastics and other products, and furthermore as precursor of carbon fibres. The fibres used in these applications generally have a tensile strength of 0.3–1.2 GPa and a modulus of 3–30 GPa.

The method of preparation most commonly used for this type of fibre is the so-called wet spinning process. In this process, the polymer is dissolved in a suitable medium to obtain a concentration that is suitable for spinning, upon which the solution is forced through a spinneret ad the filaments obtained are passed through a coagulation bath, in which the solvent is removed and the polymer precipitates.

Besides the above-mentioned applications for synthetic polyvinyl alcohol fibres, there is increasing demand and a growing market for so-called technical-grade polyvinyl alcohol fibres, for instance for composite applications.

For these applications the fibres are to have a higher modulus and tensile strength.

Numerous methods have already been proposed, particularly in patent literature, for the preparation of polyvinyl alcohol fibres patent literature, for the preparation of polyvinyl alcohol fibres having improved mechanical properties.

From Applied Polymer Symposia No. 6 (1967), pp. 109–149, for instance, it is known to prepare fibres having a tensile strength of about 1.2 GPa by coagulation spinning (phase separation) of dilute solutions of polyvinyl alcohol in organic solvents, followed by stretching. From FR-A-1.280.192 it is known to prepare fibres having a maximum tensile strength of 1.7 GPa by coagulation followed by stretching, starting from solutions of polyvinyl alcohol in water in the presence of boric acid.

In the above-mentioned publications nothing is said about the moduli of the fibres obtained. Fro DE-B-2.132.055 it is known to convert a solution of polyvinyl alcohol in water into fibres having a maximum tensile strength of about 1.8 GPa and a maximum modulus of about 40 GPa through coagulation spinning and a special very laboricus multistage stetching operation with interim water treatment.

All the methods referred to start from a polyvinyl alcohol having a relatively low weight-average molecular weight, in general between $6 \times 10^4$ and $12 \times 10^4$, the fibres obtained having a strength and modulus that, though being higher than those of commercially available synthetic polyvinyl alcohol fibres, are not yet high enough for most technical applications.

It further is known to prepare fibres of very high tensile strength and modulus starting from solutions of polymers having a high molecular weight, see GB-B-2.042.414 and 2.051.667. According to the process described in GB-B-2.042.414, to this end a dilute solution of, for instance, polyethylene is spun, the filament obtained is cooled to a gel filament, and the solvent-containing gel filament is stretched at elevated temperature. According to the process described in GB-B-2.051.667 to this end a solution of high molecular weight polyethylene is spun, the solvent is optionally removed largely or partly, and the gel filament is subjected at a specific temperature to stretching at a high stretch ratio that is related to the molecular weight. In these known processes it has been found that the moduli, but especially the tensile strengths, that can be attained increase with the molecular weight of the polyethylene.

These known processes can, therefore, be used to prepare polyethylene based fibres having a tensile strength well in excess of 1.2 GPa and moduli of more than 20 GPa.

According to the above-mentioned GB-B-2.042.414 the process proposed in it can be used, inter alia, to prepare fibres having a high strength and modulus from polyvinyl alcohol. This is confirmed by, for instance, EP-A-105.169, which discloses a process for the preparation of fibres having a high tensile strength (1.3–2.2 GPa) and a high modulus (40–70 GPa) by spinning of a dilute solution of high molecular weight polyvinyl alcohol, with a weight-average molecular weight well in excess of $5 \times 10^5$, in particular well in excess of $1 \times 10^6$, cooling of the spun filament to obtain a gel filament, and stretching of this filament after extraction of the solvent.

According to EP-A-146.084 it is possible to prepare fibres of high strength and modulus starting from a polyvinyl alcohol having a relatively low molecular weight, by applying a special dry/wet coagulation spinning process, followed by cooling, solvent removal and drawing. A disadvantage of the process of EP-A-146.084 ad also of EP-A-105.169 is that the removal of solvent from the fibers by e.g. extraction is extremely difficult. In EP-A-105.169 an extraction time of 92 hours is mentioned. So both processes are not suitable for commercial operation.

SUMMARY

The present invention provides a process for the preparation of articles having a high strength and modulus from polyvinyl alcohol in which the above-mentioned disadvantages are not or hardly present.

Though the invention relates in the first place to the preparation of filaments or fibres, it also relates to the preparation of tapes, ribbons, films, tubes, bars or profiles on the basis of polyvinyl alcohol.

The invention relates to a process for the preparation of an article having a high tensile strength and modulus from polyvinyl alcohol which is characterized in that:

(a) a solution of a polyvinyl alcohol in a suitable solvent or mixture of solvents is converted into a shaped, solvent-containing article at a temperature above the dissolution temperature;

(b) this article is converted into a gel article having a homogeneous gel structure by rapid cooling to below the gelation temperature;

(c) the solvent present in this gel article is largely removed by extraction with a mixture of a lower, aliphatic alcohol or ketone and water having a watercontent of 20–95 vol. %;

(d) during or after solvent removal, the gel article is stretched at a temperature above the glass transition temperature but below the decomposition temperature of polyvinyl alcohol.

DETAILED DESCRIPTION OF THE INVENTION

In the present process use can be made of high molecular weight polyvinylalcohol, e.g. as described in EP-A-105.169. However, the preparation of such a polyvinylalcohol is extremely laborious and also the preparation of a homogenous solution is very difficult, while moreover—due to the high viscosity of solutions of high molecular weight polyvinylalcohol—relatively dilute solutions have to be used.

Therefore preferably use is made of a polyvinylalcohol that has a weight-average molecular weight of between $2.5 \times 10^4$ and $5 \times 10^5$, by preference between $5 \times 10^4$ and $3 \times 10^5$.

Such a polymer is prepared on industrial scale, usually by polymerisation of vinyl acetate followed by hydrolysis. The term polyvinyl alcohol should be understood as meaning a polymer consisting of at least 50% of vinyl alcohol monomer. The polymer may further contain minor amounts of polymers or other substances, such as fillers and the like, that are compatible with polyvinyl alcohol.

As solvent, use may be made of various solvents known for polyvinyl alcohol, such as saturated, aliphatic, multivalent alcohols or dimethyl sulphoxide. It is preferred to use ehtylene glycol, glycerol or dimethyl sulphoxide as solvent.

Use can of course also be made of a mixture of solvents, for instance ethylene glycol and water.

The solutions to be used can be prepared in various ways, for instance by suspending solid polyvinyl alcohol in the solvent, followed by stirring at elevated temperature, or by converting the suspension using a twin-screw extruder provided with mixing and conveying facilities.

The concentration of the solution to be used may vary. It has been found that highly concentrated solutions can be used in the process according to the invention. In particular, solutions with a concentration of between 5 and 50 wt. %, and preferably between 20 and 40 wt. %, will be used if starting from a polyvinylalcohol with a relatively low molecular weight.

Conversion of the solution into a shaped, solvent-containing article can be effected in various ways in the process according to the invention, for instance by spinning into a filament or ribbon using a spinneret with a round or slit-shaped aperture, respectively, or by extruding using an extruder, usually with a profiled head.

The temperature during conversion is to be higher than the dissolution temperature. This dissolution temperature, of course, depends on the solvent chosen, the concentration, the molecular weight of the polyvinyl alcohol and the pressure used. For ethylene glycol, for instance, the dissolution temperature is about 90° C.

In general, the conversion temperature will be chosen well above the dissolution temperature, for instance about 140°–180° C. when use is made of ethylene glycol.

It goes without saying that this temperature is kept below the polyvinyl alcohol decomposition temperature.

An important part of the process according to the invention is cooling to below the gelation temperature of the shaped, solvent-containing article such that a gel article with a homogeneous gel structure is obtained, use being made of rapid cooling, preferably using a liquid cooling (quenching) medium.

The gelation temperature naturally depends on, inter alia, the solvent and in general virtually agrees with the above-mentioned dissolution temperature.

The object is preferably cooled to about ambient temperature.

It has further been found that the nature of the cooling medium, too, influences the mechanical properties of the objects ultimately obtained. By preference, methanol is used as cooling medium.

There further may be advantage in subjecting the object to a draw-down prior to cooling. It is preferred to limit the draw-down ratio to maximum 20:1, the most preferred draw-down ratio being maximum 10:1.

It has further been found that a product having better mechanical properties can be obtained if a higher spinning rate is used.

From the gel object obtained after cooling, the larger part of the solvent still present is subsequently removed by extraction. The very essence of the present invention is to use a mixture of a lower aliphatic ketone, e.g. acetone, or a lower aliphatic alcohol, e.g. methanol or ethanol, and water having a water content of between 20 and 95, preferably 30 to 60 vol. %, as extractant.

It appears that by using such an extractant mixture the extraction time needed can be very short, viz. 3–10 minutes at roomtemperature. Preferably a mixture of acetone and water is used as extractant. If desired, the extraction can be effected at elevated temperature, but the temperature must be lower than that at which the gel dissolves.

During or, preferably, after extraction, the gel articles are stretched in one or more steps. The temperature is then generally kept above the glass transition temperature, but below the decomposition temperature of polyvinyl alcohol. By preference, stretching is effected at a temperature of between 160° and 240° C., in particular between 180° and 230° C.

It has been found that high stretch ratios can be applied in the subject process. In general, a stretch ratio of at least 10:1 is used, and preferably of at least 20:1.

The article according to the invention are suitable for virtually all technical applications, such as composite applications, precursor of high-quality carbon fibres, replacement of glass fibres, etc.

If desired, minor amounts of customary additives, stabilisers and the like can be incorporated in or on the objects.

EXAMPLES OF THE INVENTION

The invention will be elucidated in the following examples, without, however, being restricted thereto.

EXAMPLE I

An amount of polyvinyl alcohol powder with a weight-average molecular weight of $1.15 \times 10^5$ (obtained from the Aldrich company) and a degree of hydrolysis of 100% was added to ethylene glycol in an amount of 25 g per 100 ml ethylene glycol, upon which the suspension was stirred for two hours at 160° C.

The spinning solution was transferred to a double-walled cylinder which was thermostatted with oil heating at a temperature of 160° C. By means of a piston coupled to a variable-speed motor, the solution was forced through a capillary (0.5 mm diameter) into a quench bath at a rate of 129 ml/hour. As quenching medium, use was made of methanol; the quench temperature was 20° C. The quenched filaments were wound at a rate of 60 cm/sec., which corresponded to a drawdown ratio of V=3.3. The filament was then deposited in an extraction bath of acetone/water (50 vol. % of water) at 20° C. during 9 minutes. The extracted filament was air-dried at 20° C. and subsequently stretched 26 times at 190° C. The filament obtained had a tensile strength of 1.9 GPa, a modulus of 45 GPa, an elongation of 4.2% and a dtex of 7.5.

The tensile strengths and moduli of the filaments thus obtained were determined using a Zwick 1445 tensile testing machine. The specimen length was 50 mm and the rate of elongation 5 mm/min. The modulus was the 1 % modulus determined from the tangent to the initial section of the stress-strain curve.

COMPARATIVE EXAMPLES A-F

The process of Example I was repeated but now extracting with methanol during different extraction times.

The results are summarised in Table I.

TABLE I

| Example | Extraction time | dtex | Strength (GPa) | Modulus (GPa) | Elongation (%) |
|---|---|---|---|---|---|
| A | 10 min. | 8.4 | 1.58 | 33 | 4.3 |
| B | 15 min. | 8.7 | 1.54 | 29 | 4.7 |
| C | 1 hour | 8.2 | 1.53 | 34 | 3.9 |
| D | 2 hours | 7.8 | 1.54 | 37 | 4.1 |
| E | 3 hours | 7.5 | 1.63 | 36 | 4.4 |
| F | 24 hours | 7.5 | 1.78 | 37 | 4.4 |

From the above examples it can be concluded that even after 24 hours extraction with methanol the resulting fiber has a lower strength and modulus as the fiber of example I.

EXAMPLES II-VII

The process of example I was repeated but now using different concentrations of water in the extractant during 9-10 minutes. The results are summarized in Table II.

TABLE II

| Example No. | Acetone-conc. in % | dtex | strength (GPa) | modulus (GPa) | elongation (%) |
|---|---|---|---|---|---|
| II | 10 | 7.6 | 1.83 | 42 | 4.3 |
| III | 25 | 8.0 | 1.77 | 37 | 4.4 |
| IV | 50 | 7.5 | 1.90 | 44 | 4.2 |
| V | 75 | 7.4 | 1.85 | 45 | 4.3 |
| VI | 80 | 8.5 | 1.44 | 35 | 3.9 |
| VII | 90 | 8.4 | 1.42 | 32 | 3.7 |

EXAMPLE VIII

The process of Example I was repeated but now extracting with a water-methanol mixture (50 vol. % water) during 10 minutes.

The product had a dtex of 6.8, a strength of 1.8 GPa, a modulus of 40 GPa and an elongation of 4.1%.

EXAMPLE IX

The process of example I was repeated using a solution of polyvinylalcohol in dimethylsulfoxide.

The filament obtained had a dtex of 6.8, a tensiled strength of 1.8 GPa, a modulus of 42 GPa and an elongation of 4.4%.

COMPARATIVE EXAMPLE G

The process of example IX ws repeated, but now extracting with methanol during 20 minutes.

The filament obtained had a dtex of 7.4, a tensile strength of 1.5 GPa, a modulus of 30 GPa and an elongation of 5%.

What we claim is:

1. Process for the preparation of an article having a high tensile strength and modulus from polyvinyl alcohol, comprising the steps of:
   (a) forming a solution of a polyvinyl alcohol in a suitable solvent or mixture of solvents and converting said solution into a shaped, solvent-containing article at a temperature above the dissolution temperature of polyvinyl alcohol in said solvent or solvent mixture;
   (b) converting said shaped article into a gel article having a homogeneous gel structure by rapid cooling thereof to below the gelation temperature;
   (c) substantially removing the solvent present in said gel article by extraction with a mixture of water and a lower aliphatic alcohol or ketone having a water content of 20-95 vol. %;
   (d) stretching the gel article, during or after solvent removal, at a temperature above the glass transition temperature but below the decomposition temperature of polyvinyl alcohol employing a stretch ratio of at least 10.

2. Process according to claim 1, wherein a 5-50 wt. % solution of a polyvinyl alcohol with a weight-average molecular weight of between $2.5 \times 10^4$ and $5 \times 10^5$ is used.

3. Process according to claim 1, wherein said solvent is a saturated, aliphatic multivalent alcohol.

4. Process according to claim 1, wherein said solvent is dimethyl sulphoxide.

5. Process according to claim 1, including drawing down, prior to cooling, said shaped, solvent-containing article.

6. Process according to claim 1, including quenching said solvent-containing article.

7. Process according to claim 1, said extraction mixture has a water content of 30-60 vol. %.

8. Process according to claim 1, wherein said extraction mixture contains acetone and water.

9. Process according to claim 1, wherein said extraction is effected at elevated temperature.

10. Process according to claim 1, wherein said stretching is effected at a temperature of between 160° and 240° C. using a stretch ratio of at least 20:1.

11. Process for preparing an article having high tensile strength and high modulus from polyvinyl alcohol comprising the steps of:
   (a) forming a solution of polyvinyl alcohol having a weight average molecular weight of between $5 \times 10^4$ and $3 \times 10^5$ at a concentration of 5 to 50 wt. %, in a solvent of a saturated aliphatic multivalent alcohol or dimethyl sulfoxide, and converting said solution into a shaped solvent-containing article at a temperature above the dissolution temperature of said polyvinyl alcohol in said solvent;
   (b) rapidly cooling said article to below the geltation temperature to form a shaped gel article having a homogeneous gel structure;

(c) substantially removing the solvent content of said gel article by extraction with a mixture of water and a lower aliphatic alcohol or ketone containing 20–95 vol. % water;

(d) stretching the gel article during or after solvent removal, at a temperature above the glass transition temperature but below the decomposition temperature of said polyvinyl alcohol, at stretch ratio of at least 10.

12. A process according to claim 11 wherein said water content is from 30 to 60 vol. %.

13. A process according to claim 11 wherein said extraction mixture contains 5–80 vol. % acetone and 95–20 vol. % water.

* * * * *

UNITED STATES PATENT AND TRADEMARK OFFICE
CERTIFICATE OF CORRECTION

PATENT NO. : 4,812,277

DATED : March 14, 1989

INVENTOR(S) : MOKVELD et al.

It is certified that error appears in the above-identified patent and that said Letters Patent is hereby corrected as shown below:

Column 1, line 28, the correct word for "ad" is --and--; Column 1, lines 39 and 40, delete "for the preparation of polyvinyl alcohol fibres patent literature,"; Column 1, line 55, the correct word for "Fro" is --From--; Column 1, line 60, correct the spellings of "laborious" and "stretching".

Column 3, line 33, correct the spelling of "ethylene".

Column 6, line 1, delete "tensiled" and insert --tensile--; Column 6, line 6, the correct word for "ws" is --was--; Column 6, line 66, correct the spelling of "gelation".

Signed and Sealed this

Twenty-fourth Day of October, 1989

Attest:

DONALD J. QUIGG

Attesting Officer

Commissioner of Patents and Trademarks